United States Patent [19]

Kizu et al.

[11] Patent Number: 4,516,265
[45] Date of Patent: May 7, 1985

[54] OPTICAL CHARACTER READER

[75] Inventors: Shuji Kizu, Yokohama; Tsutomu Ikeda; Masanori Iwamoto, both of Tokyo, all of Japan

[73] Assignee: Tokyo Shibaura Denki Kabushiki Kaisha, Kawasaki, Japan

[21] Appl. No.: 365,385

[22] Filed: Apr. 5, 1982

Related U.S. Application Data

[63] Continuation-in-part of Ser. No. 242,565, Mar. 11, 1981, abandoned.

[30] Foreign Application Priority Data

Mar. 14, 1980 [JP]  Japan .................................. 55-32300
Mar. 6, 1981 [EP]  European Pat. Off. ........ 81101659.1

[51] Int. Cl.³ .......................... G06K 9/20; G06K 9/00
[52] U.S. Cl. ......................................... 382/48; 382/1; 382/9; 382/63
[58] Field of Search ..................... 382/1, 9, 19, 48, 62, 382/63

[56] References Cited

U.S. PATENT DOCUMENTS 3,414,731 11/1968 Sperry ..................................... 382/1
3,774,162 11/1973 Flaherty et al. ......................... 382/1
3,846,753 11/1974 Spanjersberg ......................... 382/48
4,034,341 7/1977 Iseno et al. ............................ 382/48
4,061,914 12/1977 Green .................................... 250/201
4,158,835 6/1979 Miura et al. ........................... 382/48

OTHER PUBLICATIONS

L'Onde Electrique, vol. 46, No. 477, Dec. 1966, pp. 1370-1383, Paris (FR); M. Bordes et al.

Primary Examiner—John C. Martin
Assistant Examiner—Michael D. Parker
Attorney, Agent, or Firm—Cushman, Darby & Cushman

[57] ABSTRACT

An optical character reader comprises a pre-scanner and a main scanner. The pre-scanner coarsely scans the surface of a postal item and generates video signals representing a postal item pattern. The pattern is divided into a plurality of blocks. Of these blocks, a destination address block, for example, is selected. The coordinates of the lower side of the destination address block are determined. According to the coordinates a limited area of the destination address block is determined, which is to be scanned by the main scanner. The main scanner scans finely the limited area and generates high resolution video signals. According to the high resolution video signals a postal code in the destination address block is detected and recognized.

6 Claims, 5 Drawing Figures

OPTICAL CHARACTER READER

CROSS-REFERENCE TO THE RELATED APPLICATION

This application is a continuation-in-part of U.S. patent application Ser. No. 242,565, which was filed Mar. 11, 1981 and now abandoned.

BACKGROUND OF THE INVENTION

This invention relates to an optical character reader, and particularly to an optical character reader which can read a postal code written or typed on a postal item.

A known optical character reader (OCR) for reading the postal code of a postal item comprises a pre-scanner and a main scanner which are spaced for a distance along the transport path of postal items. The pre-scanner coarsely scans a postal item, for example, an envelope, and generates video signals corresponding to the pattern of the postal item. According to the video signals the position of the postal code is determined through format decision. Based on the result of the format decision the main scanner scans finely the postal code. The optical character reader has a problem, however. The pre-scanner cannot distinguish the postal code from characters written or typed near the code, at the same line or the line above or below the code. It therefore often regards such characters as part of the postal code. When this happens, a correct format decision is impossible and the envelope will be rejected. The optical character reader has but a poor reading accuracy.

SUMMARY OF THE INVENTION

Accordingly an object of this invention is to provide an optical character reader with an improved reading accuracy.

According to the invention, a pre-scanner scans coarsely a relatively large area of a postal item and generates video signals. In accordance with the video signals the pattern of the postal item is divided into a plurality of blocks. The positions of such blocks are detected by a coordinate detector, and the main scanner scans finely a desired one of the blocks and generates high resolution video signals. According to the high resolution video signals the postal code written or typed on the postal item is distinguished from the name and address on the postal item. Thereafter the postal code is located by the format decision. After its position has thus been determined, the postal code is read and recognized.

DETAILED DESCRIPTION OF THE PREFERRED EMBODIMENT

Figure 1:
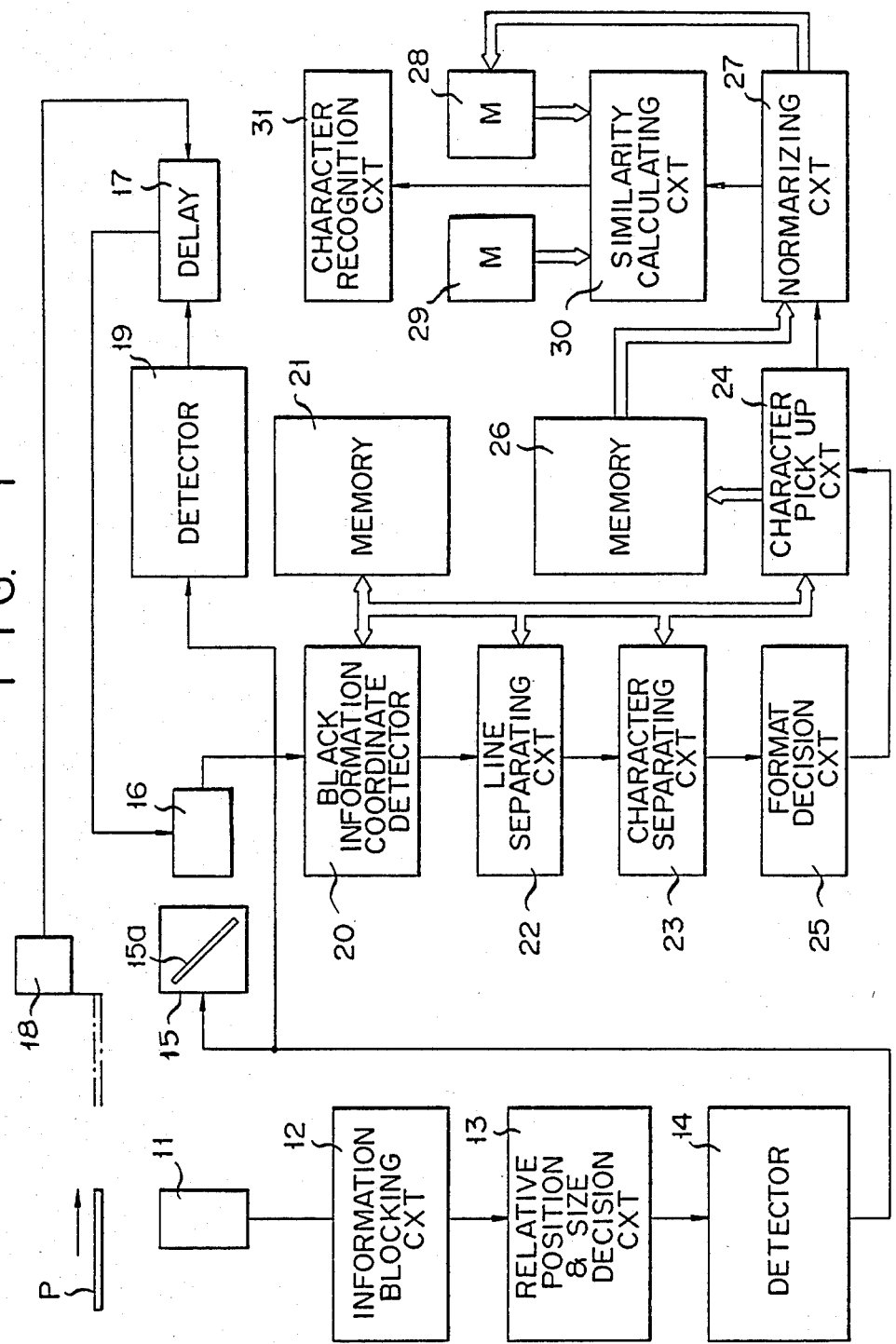
FIG. 1 is a block circuit diagram of an optical character reader according to this invention.

As shown in FIG. 1, a pre-scanner 11 has its output coupled to the input of an information blocking circuit 12. The pre-scanner 11 coarsely scans a postal item P and generates video signals representing the surface pattern of the postal item P. The information blocking circuit 12 processes the video signals, thus dividing the surface pattern of the item P into a plurality of pattern blocks. More precisely, the circuit 12 includes, for example, a counter which processes the video signals and calculates the coordinates of the pattern blocks in the known method. The output of the information blocking circuit 12 is connected to the input of a relative position and size decision circuit 13. The circuit 13 receives the output signals of the circuit 12 or block information and processes the block information, thus determining the positional relation of the pattern blocks and the sizes of the pattern blocks. The output of the circuit 13 is coupled to the input of an address block position decision circuit 14. The circuit 14 determines the coordinate of the upper or lower side of an address block which have been determined by the circuit 13. The output of the circuit 14 is coupled to a galvanometer 15, a main scanner 16 and a detector 19.

The galvanometer 15 has a movable mirror 15a. The mirror 15a is moved according to the output data from the address block position decision circuit 14. The mirror 15a is so moved as to determine the size of an area (i.e. the address block) of the postal item P, which is to be scanned finely by the main scanner 16. The main scanner 16 stands in face-to-face relation with the galvanometer 15. The set terminal of the main scanner 16 is connected to the output of a delay circuit 17. The delay circuit 17 has two input terminals which are connected to detectors 18 and 19, respectively. The detector 18 is so designed as to detect an end of a postal item P. The detector 19 is so designed as to detect a delay time corresponding to a distance l between the leading edge of the address block and the end of the postal item P.

The output of the main scanner 16 is connected to the input of a black information coordinate detector 20. The detector 20 calculates the coordinates of the black points forming the address block according to the output signals of the main scanner 16, i.e. high resolution video signals corresponding to the pattern of the address block. The high resolution video signals are stored into a memory 21. The memory 21 is connected to a line separating circuit 22, a character separating circuit 23 and a character pickup circuit 24. The output of the detector 20 is connected to the input of the line separating circuit 22, the output of the circuit 22 is connected to the input of the character separating circuit 23, and the output of the circuit 23 is connected to the input of a format decision circuit 25. The output of the circuit 26 is connected to the set terminal of the character pickup circuit 24.

The output of the character pickup circuit 24 is connected to the input of a normalizing circuit 27, the output of which is connected to the write-in port of a memory 28. Further provided is a memory 29 which stores standard character patterns. The read-out port of the memory 28 and that of the memory 29 are coupled to a similarity calculating circuit 30. The output of the circuit 30 is connected to a character recognition circuit 31.

Figure 2:
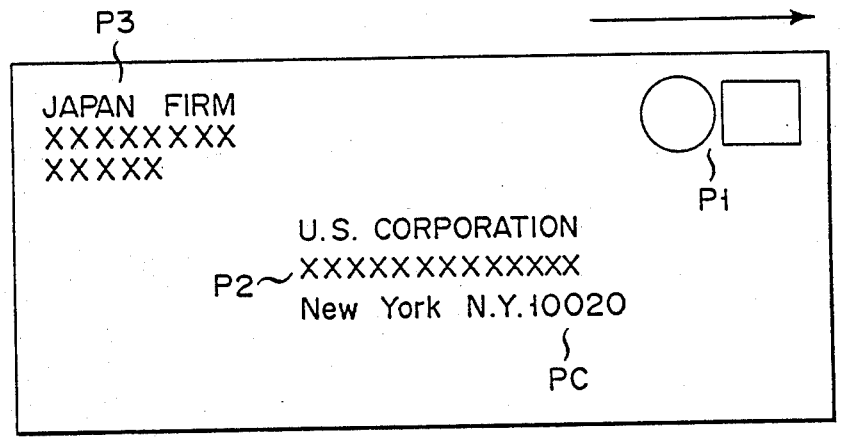
FIG. 2 is a plan view of a postal item.

Now it will be described how the optical character reader of FIG. 1 reads a postal code PC written or typed on such a postal item P as shown in FIG. 2.

The postal item P has a post stamp P1 glued to it. On the item P a destination address P2 is typed or written and a sender's address P3 is printed, typed or written. The postal item P is transported at a predetermined speed in the direction of arrow, carried by a transport device (not shown). As the postal item P is transported, the pre-scanner 11 scans the item P coarsley, at the pitch of, for example, 0.2 mm. The pitch of scanning depends on the transport speed of the postal item P and the vertical scanning period. The pre-scanner 11 generates video signals which represent the pattern of the postal item P. The video signals are supplied to the information blocking circuit 12.

Figure 3:
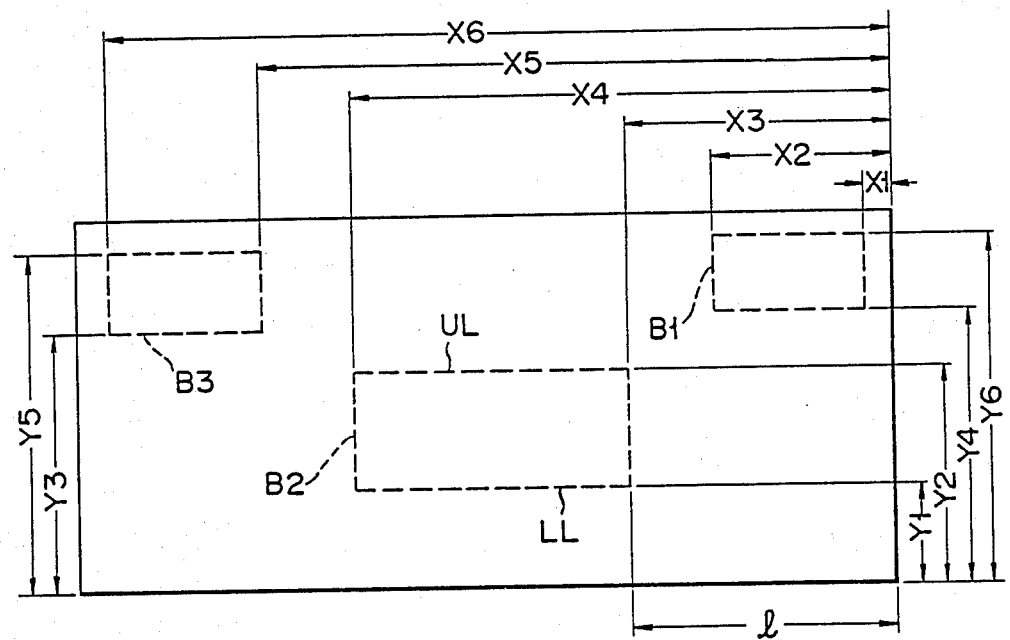
FIG. 3 shows a pattern of a postal item, shown in a few blocks.

The information blocking circuit 12 measures the periods during which each video signal remains at a white level and a black level. Further the circuit 12 counts scanning lines which correspond to video signals which remain at a black level for some time. The periods and the scanning lines having been measured and counted, a stamp block B1, a destination address block B2 and a sender's address block B3 are detected as shown in FIG. 3. The position of each block is determined by detecting the coordinates of its four corners. That is, the stamp block B1 is located by the coordinates (X1, Y4), (X1, Y6), (X2, Y4) and (X2, Y6). Similarly, the destination address block B2 is located by the coordinates (X3, Y1), (X3, Y2), (X4, Y1) and (X4, Y2). And the sender's address block B3 is located by the coordinates (X5, Y3), (X5, Y5), (X6, Y3) and (X6, Y5). The information blocking circuit 12 generates coordinate information items which represent these coordinates. The information items are supplied to the block relative position and size decision circuit 13. According to the information items the circuit 13 determines the relative positions of the blocks B1, B2 and B3 and the sizes of these blocks B1, B2 and B3. That is, the circuit processes the information items and determines the position and size of each block. The circuit 13 generates data representing the positions and sizes of the blocks B1, B2 and B3, which are supplied to the address block coordinate detecting circuit 14. The circuit 14 determines the coordinate of, for example, the lower side LL or upper side UL of the destination address block B2. Further it determines the length of the side LL or UL. The coordinate of the lower side LL is Y1 or the coordinate of the upper side UL is Y2. The output data of the circuit 14 are supplied to the galvanometer 15.

According to the data from the address block coordinate detecting circuit 14, the mirror 15a of the galvanometer 15 so moves as to receive an image of the entire destination address P2. When the postal item P reaches the detector 18, the detector 18 supplies a detection signal to the delay circuit 17. Then the delay circuit 17 produces no output signal until the postal item P reaches a position where the main scanner 16 can scan the front side of the destination address block B2 reflected in the mirror 15a. When the delay circuit 17 generates an output signal, the signal is supplied to the main scanner 16. In response to output signal of the circuit 17 the main scanner 16 starts scanning finely the image of the destination address block B2, at the pitch of, for example, 0.125 mm. The main scanner 16 generates high resolution video signals, which are supplied to the black information coordinate detector 20.

Figure 4:
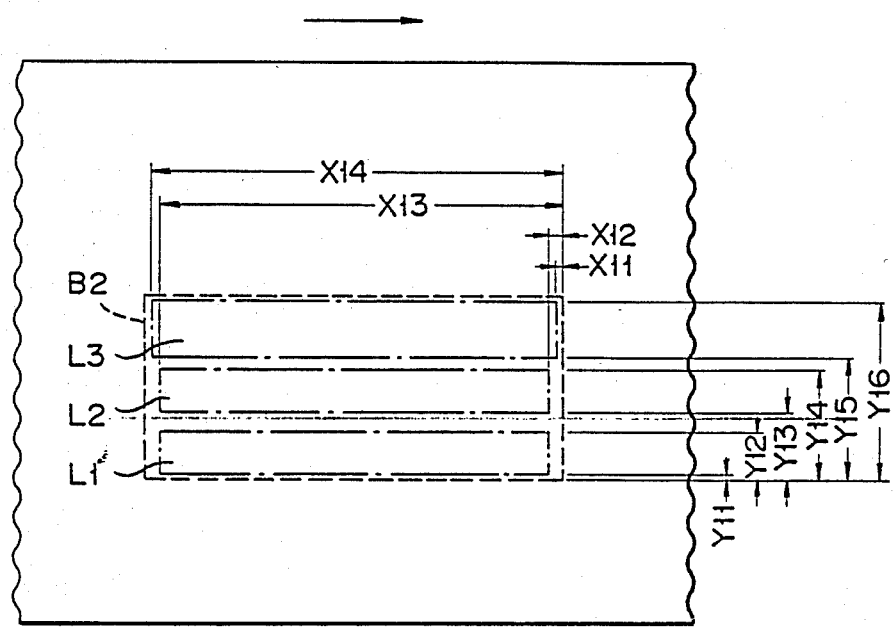
FIG. 4 shows a block constituting a destination address.

According to the high resolution video signals from the main scanner 16, the detector 20 detects the black data of the destination address block B2, i.e. the coordinates of character lines L1, L2 and L3 which are shown in FIG. 4. The coordinates of the lines L1, L2 and L3 are defined by using the adjacent two sides of the address block B2 as X axis and Y axis, respectively. The detector 20 generates data representing the coordinates of the lines L1, L2 and L3. That is, the line L1 is located by the coordinates (X12, Y11), (X12, Y12), (X13, Y11) and (X13, Y12). The line L2 is located by the coordinates (X11, Y15), (X11, Y16), (X14, Y15) and (X14, Y16). These line coordinate data are stored into the memory 21, which also stores pattern information, which forms of binary coded data corresponding to the high resolution video signals generated by the main scanner 16.

Figure 5:
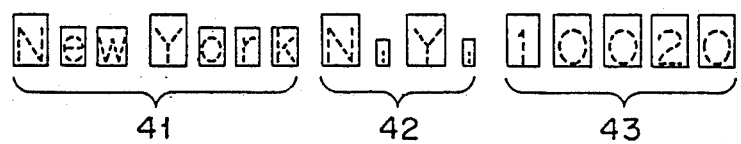
FIG. 5 illustrates how characters are separated.

The line coordinate data are supplied also to the line separating circuit 22. The circuit 22 processes the line coordinate data and picks up the character line L1 including the character of the postal code. The circuit 22 generates data representing the line L1, which is supplied to the character separating circuit 23. The circuit 23 divides the line L1 into such character masks as shown in FIG. 5 and generates information representing the character masks. The character mask information is supplied to the format decision circuit 25, which determines a city name block 41, a state name block 42 and a postal code block 43. When the address information corresponding to the postal code block 43 is supplied to the character pickup circuit 24, the circuit 24 takes from the memory 21 the character information which corresponds to the postal code block 43. The character information thus picked up is normalized by the normalizing circuit 27 and stored into the memory 28. The postal code character information is then tranferred, character by character, to the similarity calculating circuit 30.

The similarity calculating circuit 30 calculates the similarity of the postal code characters with respect to the standard character patterns stored in the memory 29. The result of the calculation is supplied to the character recognition circuit 31. According to the similarity calculated, the circuit 31 recognize the postal code or all the characters of the postal code (in this example, "10020"). Once the postal code is thus recognized, the postal item P is sorted into a chute corresponding to the postal code.

As mentioned above, according to this invention a postal item is coarsely scanned by a pre-scanner and the surface pattern of the postal item is divided into a plurality of blocks. A desired one of these blocks are selected, for example, a destination address block. The coordinate of the upper or lower side of the selected block is determined by a coordinate detecting circuit, which generates data representing the coordinate. These data determine a limited area of the selected block, which is to be scanned by a main scanner. The main scanner finely scans the limited area, thus generating high resolution video signals. The high resolution signals are processed, thereby separating one line of character from the other lines belonging to the selected block and further separating the characters of each line from one another. This done, each character is recognized or identified. Since the character lines can be distinguished from one another and the characters of each line can be distinguished from one another, it seldom becomes impossible to recognize a character.

What we claim is:

1. An optical character reader for reading information from an object comprising:
   a pre-scanner for coarsely scanning a surface of the object on which the information to be read appears and generating first video signals indicative thereof;

blocking means for processing the first video signal to identify a plurality of separate and distinct blocks of information;

coordinate data means, connected to said blocking means, for determining a coordinate of a particular block from among the blocks identified by said blocking means to produce coordinate data;

a main scanner, connected to said coordinate data means, for finely scanning the particular block identified by the coordinate data and generating second video signals indicative thereof;

first memory means for storing video data corresponding to the second video signals;

line separating means, connected to said first memory means, for processing the video signals data to separate the particular block into a plurality of character lines and deriving a video data component corresponding to a particular character line including one or more characters from the second video signals data;

character separating means, connected to said line separating means, for identifying separate and distinct characters of the particular character line;

second memory means, connected to said character separating means, for storing video data corresponding to each of the separately identified characters; and character recognition means for recognizing the characters represented by the video data stored in said second memory means.

2. An optical character reader according to claim 1, wherein said main scanner comprises a galvanometer having a mirror movable in accordance with the coordinate data from said coordinate data means.

3. An optical character reader according to claim 1, wherein said coordinate data means outputs data corresponding to the coordinate of the lower side of the particular block.

4. An optical character reader according to claim 1, wherein said pre-scanner scans the surface of the object at a pitch of 0.2 mm.

5. An optical character reader according to claim 1, wherein said main scanner scans the particular block at a pitch of 0.125 mm.

* * * * *